United States Patent [19]

Ganz et al.

[11] 4,169,344
[45] Oct. 2, 1979

[54] APPARATUS FOR FABRICATING CUSHIONING AND INSULATING MATERIAL

[75] Inventors: James B. Ganz, Plainview; Stephen Koval, Forest Hills, both of N.Y.; Raymond P. Meenen, Hawthorne, N.J.

[73] Assignee: Sagan Industries, Inc., Long Island City, N.Y.

[21] Appl. No.: 873,486

[22] Filed: Jan. 30, 1978

[51] Int. Cl.² .............................................. B65B 9/04
[52] U.S. Cl. ....................................... 53/546; 53/553; 156/145
[58] Field of Search ................. 53/450, 451, 545, 546, 53/548, 550, 551, 553, 554, 555; 156/145, 146

[56] References Cited

U.S. PATENT DOCUMENTS

| | | | |
|---|---|---|---|
| 3,001,340 | 9/1961 | Gosman | 53/553 X |
| 3,164,935 | 1/1965 | Stroop | 53/546 |
| 3,389,534 | 6/1968 | Pendleton | 53/550 |
| 3,817,803 | 6/1974 | Horsky | 156/145 X |
| 3,868,285 | 2/1975 | Troy | 156/147 |

Primary Examiner—Robert D. Baldwin
Assistant Examiner—J. Reed Batten, Jr.
Attorney, Agent, or Firm—Holland, Armstrong, Wilkie & Previto

[57] ABSTRACT

An apparatus for making cushioning, shock absorbing, insulating or packaging material formed of webs of plastic material sealed together to make fluid or air filled cells in a quilted fashion. A tube forming roller forms tubes of the material. Heat sealing elements seal the webs into tubular formation and additional heat sealing elements seal the webs transversely across the tubular formation to form a series of cells. A fluid blower maintains fluid or air within the tubes during the cellular formation.

22 Claims, 7 Drawing Figures

APPARATUS FOR FABRICATING CUSHIONING AND INSULATING MATERIAL

BACKGROUND OF THE INVENTION

The invention concerns a method and apparatus for manufacturing a cushioning and insulating material and more specifically concerns a cushioning material formed of layers, preferably of plastic material having sealed areas defining closed air cells or pockets.

Cushioning and insulating material formed of layers of plastic material joined together to form closed pockets have heretofore been manufactured with rather large, complex and expensive machines. It was necessary to provide means for applying suction to form the areas in the sheet material while heat was applied to seal the layers together and separate machines were required to form the cushioning material in different widths. For these reasons a large capital outlay was required and thus such machines were available only in plants where the plastic sheet material was made. The present invention makes it practical to make insulating and cushioning material of any desired width locally at the point of use rather than in the plant where the sheet material is manufactured from raw chemical ingredients.

According to the invention, apparatus of simplified construction is provided in which two layers of sheet material in web, or ribbon, form, preferably a thermoplastic film, are moved intermittently along a fabricating line pathway through a tube forming station to corrugate one of the webs into tubular formations, through a longitudinal sealing station, to seal the webs together along longitudinal seam lines, and then the longitudinally seamed material is fed through a transverse sealing station to form transverse seams while air is blown into the longitudinally formed tubes, creating closed, sealed, air-filled, expanded cells out of the longitudinal tube formations. The sealing stations may have heating elements for heat sealing thermoplastic, preferably polyethylene, or thermally sealable layers formed out of the ribbons of plastic film. As used in this specification and in the claims below the terms web, ribbon and film are interchangeable.

Accordingly, it is a principal object of this invention to provide a new and improved method and apparatus for the manufacture of cushioning materials as outlined above.

These and other objects and many of the attendant advantages of this invention will be readily appreciated as the same becomes better understood by reference to the following detailed description when considered in connection with the accompanying drawings in which.

DETAILED DESCRIPTION OF THE INVENTION

The invention comprises an apparatus which forms a fabricating line along which a plurality of operations are performed on layers of thermoplastic films. The fabricating line pathway operates intermittently to hold the films in faced relationship at various stations along the fabricating line while the operations are performed and the ribbons of material are advanced intermittently between operations.

Figure 1:
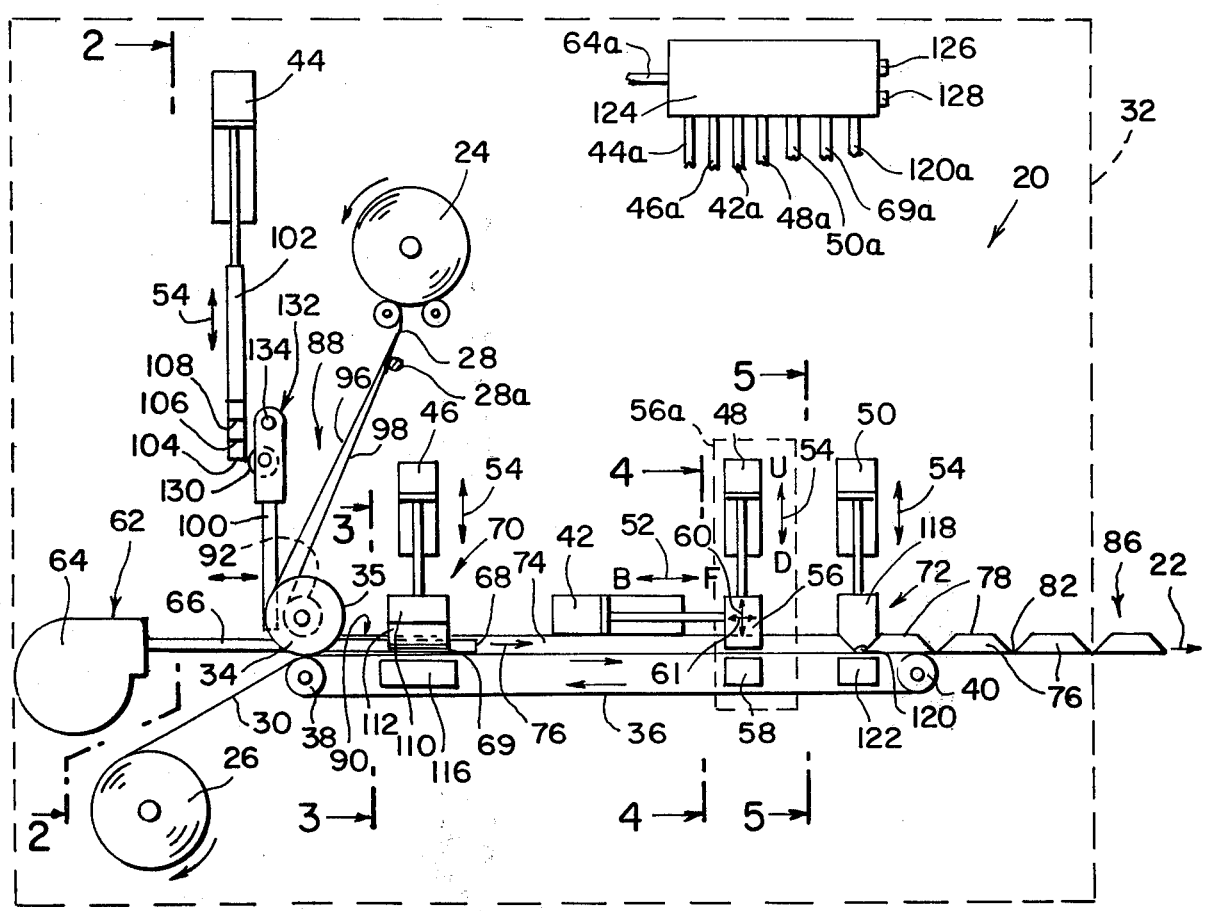
FIG. 1 is a side view diagrammatic in form with parts broken away of apparatus embodying the invention.
Figure 3:
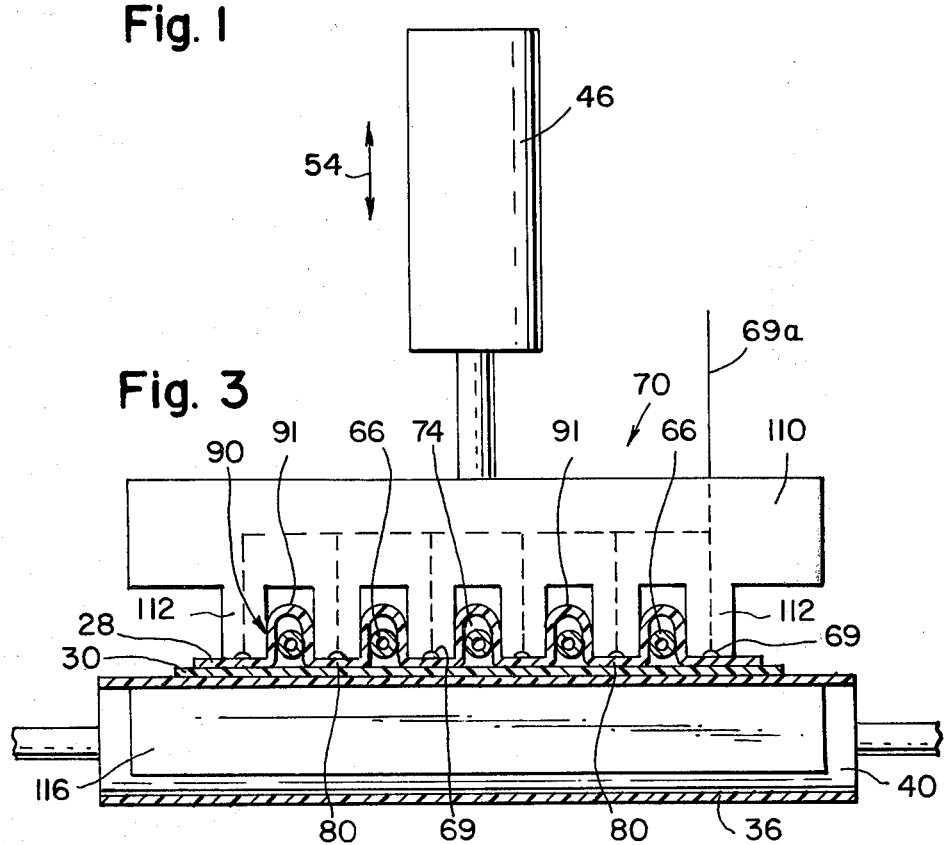
FIG. 3 is an enlarged sectional view of parts of the device along the lines 3—3 of FIG. 1.

The apparatus of the invention 20 thus comprises a fabricating line pathway 22 comprised in the main frame 32 of the apparatus 20. The main frame 32 also holds rolls 24, 26, each carrying a thin thermoplastic film 28, 30, such as polyethylene in web or ribbon form. The ribbons of material 28, 30 are pulled between a corrugating tube forming roller 34 and a movable platform, such as an endless belt 36, positioned respectively above and below the facing films 28, 30. Roller 34 and endless belt 36 are mounted to the main frame 32. The endless belt 36 is mounted by means of belt supports 38, 40, which are rotatively mounted to the main frame 32 and said belt 36 is positioned to form a part of the fabricating line pathway 22, as shown in FIG. 1 of the drawings.

The drive to move ribbons 28, 30 along the fabricating line pathway 22 and that of the processing stations along said pathway is accomplished by providing a plurality of pistons 42, 44, 46, 48, 50. These pistons are operated by compressed air in the usual manner known to the art for intermittent drives and processing stations. They may also be operated by solenoids or any other means which will accomplish an intermittent drive by actuating drive element (piston) 42 in the reciprocating movement designated by double-headed arrow 52 and drive elements (pistons) 44, 46, 48, 50 in the direction of double-headed arrows 54. Piston 48 is connected to a clamp having a pair of elements 56, 58 positioned above and below belt 36 with relation to the fabricating line pathway 22. Reference to FIG. 1 of the drawings will show that endless belt 36 travels on a pathway defining the fabricating line pathway 22 and turns around belt support 40 to return to belt support 38 on a pathway offset from fabricating line pathway 22. The functional path of endless belt 36 is in the pathway 22 of the fabricating line. In this specification and in the claims hereinbelow when the expression "above the belt 36" or "below the belt 36" may be used, it is intended to mean the belt 36 when positioned in the fabricating line pathway 22.

Thus, clamp elements 56, 58, which are disposed above and below the fabricating line pathway 22, and above and below endless belt 36 will clamp together (see double-headed arrow 60) to hold the ribbons 28 and 30 and belt 36 together between said clamping elements 56 and 58 when piston 48 moves toward letter D (for down) along double-headed arrow 54. When piston 48 is moved toward letter U (for up), the clamps 56, 58 will release the ribbons 28, 30 and the belt 36. Another piston 42 also operates on the clamp 56, 58 to move it intermittently in a forward and backward direction with reference to fabricating line pathway 22 (see double-headed arrow 61).

The timing of pistons 48 and 42 are such that piston 48 operates at its station to close the clamp 56, 58 when piston 42 is in B, or back position, and while the clamp 56, 58 is being closed. Then piston 42 moves to a forward F position, after which piston 48 moves up to open the clamps 56, 58 while piston 42 returns clamp 56, 58 reciprocally from forward F to back position B. This results in a reciprocal forward, backward movement which with the cooperative clamping action moves the ribbons of film 28, 30 forward along the pathway of the fabricating line 22 and pulls the film sheet ribbons 28, 30 from their rolls 24, 26 around roller 34 and support end 38 of the belt 36 to place them in faced relationship over belt 36 in the pathway of fabricating line 22.

The clamping means 56, 58 is shown in FIG. 1 of the drawings in diagram. In the preferred form of invention it may be mounted to the main frame 32 by means of a reciprocal carriage adapted to move forward and backward with relation to the belt 36. Piston 42 would have a fixed position with relation to the main frame 32 so that it could move such a clamp carriage from F to B and back to F. Piston 48 could in such an arrangement be mounted directly on the clamp carriage as indicated by dotted lines 56a.

The fabricating line pathway 22 also comprises fluid blowing means 62 which comprises a fluid blower 64 and a plurality of fluid ducts 66. The fluid ducts 66 are positioned along the fabricating line pathway 22 with fluid outlets 68 disposed well along the fabricating line 22 and between the ribbons 28, 30, at a point before transverse fastening station 72, preferably between longitudinal fastening station 70 and transverse fastening station 72.

Thus the first and second webs 28 and 30, respectively, are first fastened longitudinally along fastening lines 80 to form at least one tube 74 around a fluid duct outlet 68, preferably while fluid air (indicated at reference numeral 76) is blown within the tube 74. Then clamp elements 56, 58 hold the air 76 in tube 74 until the action of piston 50 at the transverse fastening station 72 forms a second fastening along fastening lines 82 and upon the next intermittent operation of the device, transverse fastening station 72 will form another set of transverse fastening lines to form a cell 78 filled with air 76.

In the preferred form of invention the material of the ribbons or webs to be processed is a thermoplastic material which can be fastened by heat sealing. The presses 110, 118 of the longitudinal 70 and transverse 72 fastening stations are provided with heating elements 69 and 120, respectively, (preferably impulse heating wires) which fasten by sealing the thermoplastic material along fastening lines 80, 82. Cell 78 will thus have longitudinal or side seals 80 and transverse or end seals 82 which are identical to fastening lines 80, 82, respectively.

In the preferred form of the invention there are thirteen fluid ducts 66. However, for purposes of brevity and succinctness, the apparatus illustrated in this specification shows only five such fluid air ducts 66. It is to be understood that the invention contemplates an apparatus having any desired number of air ducts 66. Thus, the resulting product in the preferred form of invention may be material comprising sheets of film processed from the first and second webs 28, 30, sealed together in accordance with the invention and having any desired number of rows 84 of sealed cells 78 containing pockets of fluid, such as air, 76. Each air duct 66 of the apparatus will provide air for a row of cells.

The preferred features of the invention are therefore the provision of air ducts 66 spaced well along the pathway of the fabricating line 22 and operating stations spaced along the operating line 22 which will cooperate together to form the product 86 comprising a plurality of cells 78. This cooperation is accomplished by providing a tube forming station 88 which will form first web 28, and the second web 30 into a tubular formation 90 disposed around air ducts 66, to form said tubes 74.

The tubular formations 90 are formed by the operations of the apparatus 20 to gather and currugate the first web 28 into furrows 91 while in facing relation to relatively flat second web 30 to form the as yet unsealed tubular formations 90. Then the seal of the longitudinal fastening lines to form side seals 80 is made between webs 28 and 30 to complete tubes 74 from the tubular formations 90.

Figure 2:
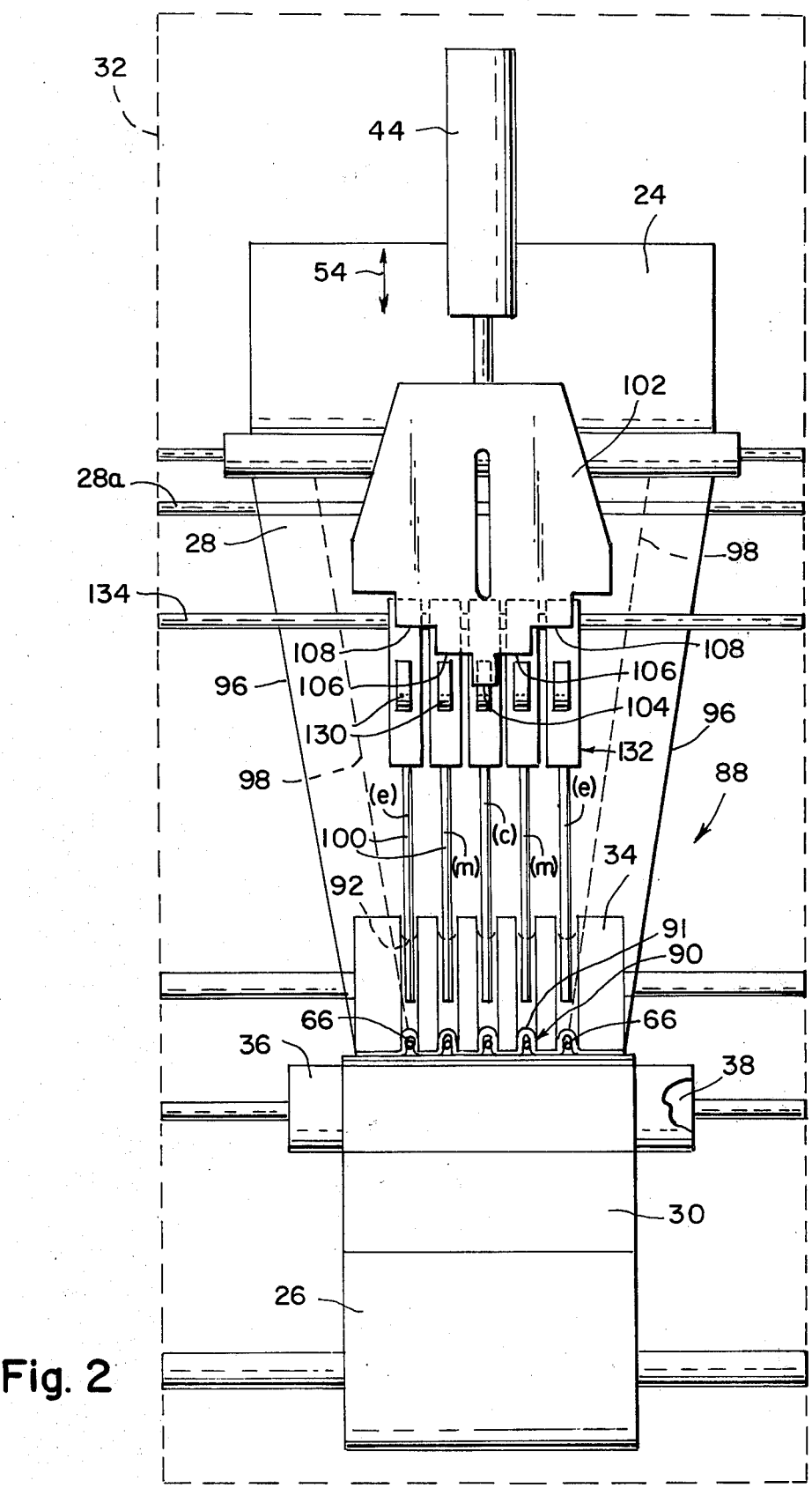
FIG. 2 is a sectional view of parts of the device showing the frame in diagrammatic dotted lines along lines 2—2 of FIG. 1.
Figure 4:
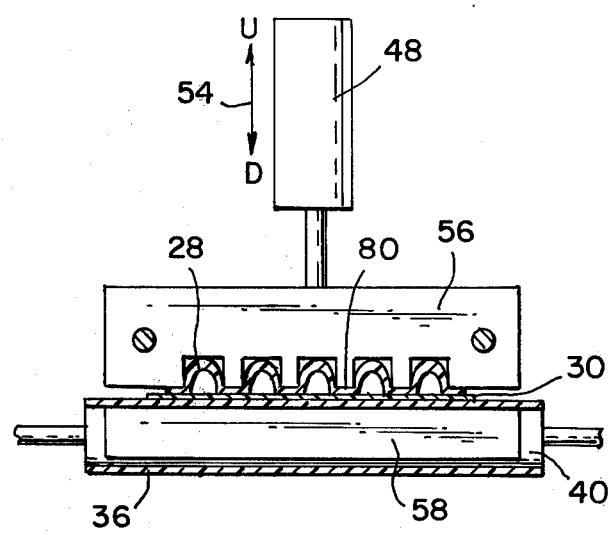
FIG. 4 is another sectional view of parts of the device along the lines 4—4 of FIG. 1.
Figure 5:
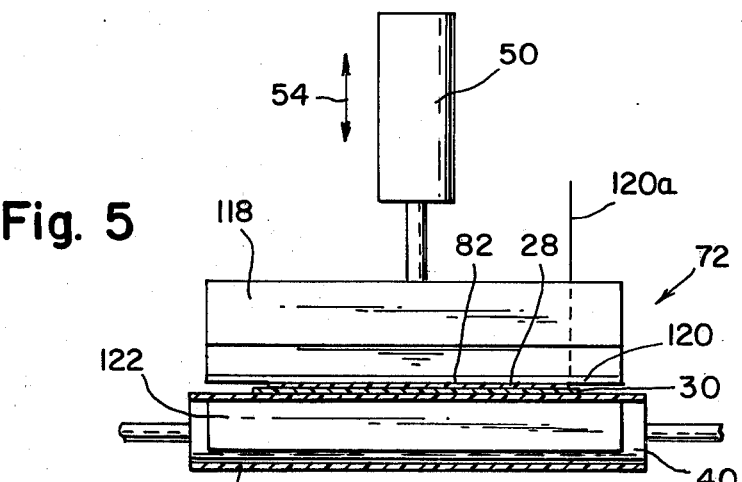
FIG. 5 is a sectional view of parts of the device along the lines 5—5 of FIG. 1.
Figure 6:
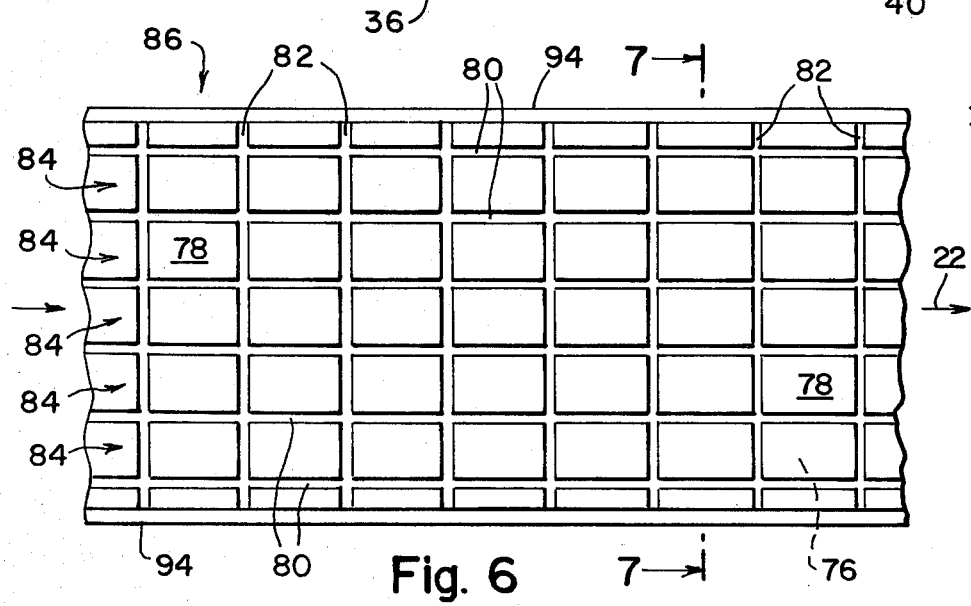
FIG. 6 is a top plan view of an indeterminate length of material produced by the device.
Figure 7:
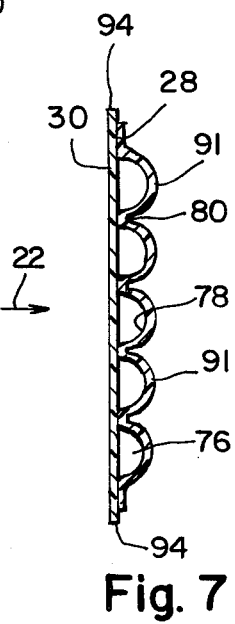
FIG. 7 is a sectional view along the lines 7—7 of FIG. 6.

Reference to FIG. 2 shows a view of roller 34 and the leading end of belt 36 with webs 28 and 30 over the belt 36, with ducts 66 shown in cross section surrounded by furrows 91 of first web 28, and the flat portions of second web 30, all being within grooves 92 and over surface of belt 36, respectively.

It is the function of the roller 34 grooves 92 to provide tubular formation to furrow first web 28 as it is moved from its feed roll 24 around tube forming roller 34. In so doing, the width of first web 28 will be substantially reduced by the gathering into furrows to form the first web portion furrows 91 of the tubing 74. It is therefore necessary to start with a first web 28 substantially wider in transverse direction than second web 30 which remains substantially flat; so that when they are positioned together between roller 34 and belt 36, as shown in FIG. 2, they will have a relatively similar width. There need not be an exact fit since the resultant material 86 can be trimmed at edges 94 if there is any overlapping.

Reference to FIGS. 1 and 2 of the drawings will show a pair of lines 96 and 98 descending from roll 24 toward roller 34. These lines designate the reduction of the transverse dimension of film 28 and the forming of furrows 91 to make the tubing 74. A line 96 indicates those portions of the first web 28 which eventually met second web 30 in facing relation to be fastened along the longitudinal fastening lines 80. Portions 96 of web 28 are guided around the outer circumference 35 of roller 34. Portions of web 28 along lines 98 are gathered into the grooves 92 during the furrowing process. Thus the first web 28 is gathered in laterally and reduced in its width during processing and it forms the greater part 91 of the tubing 74 for the fluid filled cells 78.

The webs 28 and 30 are guided to the tube forming station in faced relationship by guide means comprising the tube forming roller 34 and the endless belt 36 where it goes around roller 38. A further guide for the first web may be provided in guide means 28a which is in the form of a curved bar or tube 28a mounted to the main frame 32 to curve the web 28 laterally to and in the furrowing process.

A series of fingers 100 is provided in the tube forming station 88 to guide the first web portions into the grooves 92. The fingers 100 are operated by a cam 102 which in turn is operated by piston 44. Cam 102 has a leading edge 104 which is graduated in increments 106, 108 to provide for the central fingers 100 to lead the other fingers 100. The grooves 92 are circumferential and extend from a medial portion of roller 34 toward its ends.

After the tube forming station 88 there is a longitudinal fastening station 70 which comprises a longitudinal fastening press, such as heat sealing bar 110, provided with a plurality of heat element supports 112 containing heat elements, such as impulse heating elements 69 which are well known in the art. Heat element means 69 will run longitudinally in the direction of the pathway 22 of the fabricating line and are relatively longer than the length of a cell 78 desired to be formed in the material 86 so that for each intermittent movement of the apparatus the press 110 will seal longitudinally and then be overlapped by the next pressing operation and so on, so that complete longitudinal seal forming side seal fastening lines 80 will be made along the material 86 on each side of a tube formation 90. The pressing operation at station 70 is accomplished by piston 46 moving press 110 down against its complementary platen 116 disposed on the main frame 32 below the belt 36.

There is also a transverse fastening press, such as heat sealing bar 118, located at transverse fastening station 72 which is operated by piston 50. Press bar 118 contains a transverse heating element means 120 which presses against transverse fastening means platen 122 disposed below belt 36.

Reference to FIG. 1 will show in diagrammatic form a control box 124 having conduits 44a, 46a, 42a, 48a, 50a and 64a and start switch 126 and stop switch 128. These conduits are shown broken off but they lead respectively to pistons 44–50 and fluid blower 64. It is to be understood that the control box would be conventional to any system used to drive the apparatus whether it be compressed air or otherwise and assuming that it may be controlled by electric means well known in the art. Such means are preferred. However, any other type of control means for the drive means may be employed.

Control box 124 also shows electrical conduits 69a and 120a for the impulse heating system elements 69 and 120. The impulse heating system is conventional and well known in the art. The control box 124 of the drive is set up to provide impulse heat when presses 110 and 118 press against the platens 116 and 122 with the webs 28 and 30 between them.

OPERATION OF THE DEVICE

The starting switch 126 is pressed.

Pistons 44, 46, 48 and 50 are adjusted within the apparatus to operate simultaneously and will simultaneously move their connected elements in a downward direction toward the pathway 22 of the fabricating line. Piston 46 moves its longitudinal fastening press 110 down compressing the webs 28 and 30 between its heating element means 69, the belt 36 and platen 116. Piston 50 will move the transverse fastening press 118 down to compress the webs 28, 30 against belt 36 and platen 122 to make fastening lines 82. Piston 48 will move clamp elements 56, 58 together to clamp the webs 28, 30 to the belt 36. This has no significance during the simultaneous operation of the various stations but it is in preparation for the feeding cycle after the tube forming and sealing operations are completed.

Piston 44 will move the stepped cam 102 downward to operate the tube forming fingers 100 to push the web 28 into the grooves 92 of roller 34 to form furrows 91 for the tubes 74. This is done in a progressive sequence as piston 44 moves downward. The tube forming finger 100 in the center (c) of the apparatus is first to move inward by action of leading edge 104 of cam 102 against finger assembly wheel bearing 130 of finger assembly 132. Finger assembly 132 is hinged to the main frame 32 by means of hinge pin 134. Fingers 100 travel from a first position away from roller 34 to a second position within the grooves 92 of roller 34. The action of the timing cam 102 against wheel bearings 130 push the fingers 100 from a nominally first position into the second position.

The finger sequence progresses from center fingers (c) 100 then to middle fingers (m), then to the outer fingers at the ends (e). This moves tube forming furrows 91 of the material 28 into the grooves 92 of roller 34 in a smooth progressive gathered manner. These furrows 91 are eventually formed into bubbles or cells 78 by the longitudinal fastening operation and the transverse fastening operation as described herein. The cells 78 are filled with the fluid, such as air, 76 which filled the tube 74 under pressure from the blower means 64.

When presses 110 and 118 are fully down the electric impulse to their heating elements 69 and 120 is applied. The duration of this sealing cycle is determined by adjustable timers known to the art. When the seal timers have completed their cycle a dwell timer starts its cycle. This permits cooling of the material under pressure. The duration of this time may be determined by the cooling characteristics of the particular thermoplastic material used. When the dwell time has been completed, pistons 44, 46 and 50 will rise to a first position away from pathway 22. When pistons 44, 46 and 50 are fully up, the piston 42 reciprocates clamp elements 56 and 58 the required cell 78 length distance.

When the reciprocation movement back is complete, the pistons 44, 46 and 50 move downward again to second position toward pathway 22. When the sealing presses 110 and 118 are down the impulse electric power to their sealing elements 69 and 120 is supplied again. When the seal cycle starts, piston 48 will open the clamp 56, 58 and piston 42 will reciprocate the clamp 56, 58. When the clamp 56, 58 has reached its fully returned position, piston 42 will close the clamp 56, 58 preparing it for the next feed cycle.

The above described coordinated intermittent drive which serves to feed the first web 28 and second web 30 through the apparatus 20 and to operate the tube forming station, the sealing stations and the blower means and the controls for same are all well known in the art and may be selected from various types of electrical, mechanical or hydraulic means. The controls for such mechanisms are also well known in the art. The various connections for the control, such as control box 124, have not been shown in detail in the drawings, it being understood that each part of the drive and the fastening or heating elements are properly connected to its counterpart in the control 124.

To sum up, the drive of the apparatus 20, in its preferred form, comprises the endless belt 36 which has a surface portion forming at least a part of the fabricating line pathway 22 in cooperation with the clamping means 56, 58 and the drive means to reciprocate the clamping means 56, 58 and to move the various stations of the device intermittently with the webs 28 and 30 in position and the blowing means 64 providing air for the cells 78, as described above.

The first web 28 and second web 30 may also be referred to as films of material or ribbons of material, the three terms being synonymous in this specification and in the claims hereinbelow.

THE PRODUCT

The product of the apparatus is a material 86 which is made of first web 28 and second web 30 completed by making fastening or sealing lines 80 and 82 between the webs around a fluid filling to form the cells 78 filled with fluid. In the preferred form of the invention the fluid is air. The first set of web fastening lines 80 form at least one fluid filled tube 74 filled with fluid 76. The second set of web fastening lines divides said fluid filled tube 74 into a plurality of fluid filled cells 78.

In the resultant material 86 the first web 28, which is relatively wider than the second web 30, has been gathered in laterally to form furrows 91 which form the greater part of the tubing 74 of the fluid filled cells 78. In the preferred form of material 86 the webs 28 and 30 comprise thermoplastic material and the web fastening lines 80 and 82 are heat sealed.

While the invention has been described in its preferred form, it may take other forms without departing from the spirit and scope of the invention and it is therefore desired to be protected for all forms coming within the claims hereinbelow.

We claim:

1. An apparatus for making fluid filled cells in material comprising a main frame comprising: a fabricating line pathway; means to move material for processing along the fabricating line pathway; a tube forming station, a longitudinal fastening station, and a transverse fastening station along said fabricating line pathway; fluid blowing means associated with at least one fluid duct positioned along said fabricating pathway, said fluid duct having an outlet positioned between said tube forming station and said transverse fastening station; a tube forming roller in the tube forming station comprising at least one groove; and at least one movable finger positioned to move from a first position outside of said roller groove to a second position within said roller groove to place a portion of the material within the roller groove.

2. The apparatus as claimed in claim 1, in which the means to move material comprises first material guide means to guide a first web of material to the tube forming station and second material guide means to guide a second web of material to the tube forming station in facing relationship to said first web.

3. The apparatus as claimed in claim 1, in which the tube forming roller comprises a plurality of circumferential grooves positioned along said roller extending from a medial portion thereof toward the ends thereof, a plurality of movable fingers associated with said grooves, and finger operating means to move said fingers to place portions of said material within said grooves.

4. The apparatus as claimed in claim 3, in which the finger operating means comprises timing means to move the fingers toward the roller in a relative formation in which at least one medially positioned finger is relatively first and the end fingers are relatively last.

5. The apparatus as claimed in claim 4, in which there are an odd number of matched fingers and grooves and the timing means moves the center finger first and the end fingers last to gather in material laterally and place portions in said grooves.

6. The apparatus as claimed in claim 4, in which there are a number of matched fingers and grooves and the timing means moves central fingers first and the end fingers last to gather in material laterally and place portions in said grooves.

7. The apparatus as claimed in claim 5 which comprises a first web feed roll for a first web and a second web feed roll for a second web in which the first web feed roll is wider than the second web feed roll.

8. The apparatus as claimed in claim 5, in which the timing means comprises cam means.

9. The apparatus as claimed in claim 5, in which fabricating line pathway extends at least between the tube forming station, the longitudinal fastening station, and the transverse fastening station, the said stations are operated by intermittent drive means, and the means to move material for processing along the fabricating pathway is intermittent.

10. The apparatus as claimed in claim 9, in which the means for moving material comprises clamping means.

11. The apparatus as claimeed in claim 10, in which the means for moving the material comprises a movable platform associated with the clamping means.

12. The apparatus as claimed in claim 11, in which the movable platform is in the form of an endless belt connected to the main frame.

13. The apparatus as claimed in claim 12, in which the endless belt has a surface portion forming at least a part of the fabricating line pathway, and the clamping means is positioned about said endless belt surface portion to reciprocate in forward and reverse directions.

14. The apparatus as claimed in claim 13, in which the longitudinal and transverse fastening stations each comprise press means on a first side of the fabricating line pathway and platen means on a second side of said fabricating line pathway.

15. The apparatus as claimed in claim 14 which comprises coordinated intermittent drive means to move the fingers of the tube forming station from a first position away from the roller grooves to a second position in the said grooves, and the presses of the fastening stations from a first position away from the fabricating line pathway to a second position against the fabricating line pathway.

16. The apparatus as claimed in claim 15 which comprises drive means for the fabricating line pathway whereby the clamping means comprising clamp elements is closed with its clamp elements in clamping engagement with the fabricating line portion of the endless belt and moved in a forward fabricating line direction, and then whereby said clamp elements are opened, freeing said endless belt while said clamping means reciprocates in a backward direction; whereby when said station operative portions are in first positions the fabricating line drive means clamping engagement moves the endless belt forward and when said station operating portions are in second position the clamping means returns in a backward direction without engaging or moving the belt.

17. The apparatus as claimed in claim 16, in which first and second web material is selectively fed through the fabricating line of the apparatus along the endless belt intermittently while clamped to the endless belt.

18. The apparatus as claimed in claim 17 wherein the blower means is operable to blow fluid between a first web and a second web during the operation of the fabricating drive means and the station drive means.

19. The apparatus as claimed in claim 18, in which the presses of the fastening stations are provided with heat elements to seal thermoplastic material to be processed.

20. The apparatus as claimed in claim 19, in which the heat elements are impulse heating elements which heat seal the webs together along selected fastening lines.

21. The apparatus comprising all of the elements of claim 17 in which the selected first and second webs comprise thermoplastic material along the selected fastening lines, and the impulse heating elements are positioned in the station presses for pressing toward their platens with said webs between them.

22. The apparatus as claimed in claim 21 which comprises impulse heating control means coordinated in operation with the station drive means.

* * * * *